United States Patent Office 3,849,560
Patented Nov. 19, 1974

3,849,560
5-(5'-BARBITURILIDENE) - 4 - OXOTHIAZOLIDINE-2-IMINO HCl SALT USED AS AN ANTIMICROBIAL AGENT
Al F. Kerst, 5470 W. Geddes and John D. Douros, Jr., 6855 S. Depew, both of Littleton, Colo. 80123, and Milan Brokl, 1633 Cherry St., Denver, Colo. 80122
No Drawing. Continuation-in-part of abandoned application Ser. No. 180,923, Sept. 15, 1971. This application Dec. 1, 1972, Ser. No. 311,075
Int. Cl. A01n 9/12
U.S. Cl. 424—254     50 Claims

ABSTRACT OF THE DISCLOSURE 5-(5'-barburilidene)-4-oxothiazolidine - 2 - imino HCl salt can be used to inhibit and/or prevent growth of undesirable bacteria, fungi, yeast, and other microorganisms. This invention is particularly concerned with the bacteriostatic and bactericidal properties of 5-(5'barbiturilidene-4-oxothiazolidine-2-imino HCl salt compound against species of Mycobacterium, Salmonella, and Staphylococcus. This compound also combats the growth of certain undesirable aquatic plants such as Duckweed and Anacharis.

BACKGROUND OF THE INVENTION

This application is a continuation-in-part of our application Ser. No. 180,923, filed Sept. 15, 1971, now abandoned. While there is no dearth of barbituric microbial growth inhibitors existing today, the antimicrobial properties of 5-(5'-barbiturilidene)-4-oxothiazolidine-2-imino HCl salt have not been previously discovered. Furthermore few of the commercially available barbituric growth inhibitors offer the activity of 5-(5'-barbiturilidene)-4-oxothiazolidine-2-imino HCl salt against such a broad spectrum of bacteria, fungi, yeast, et cetera. This broad activity is often desirable since the inhibition of one microorganism species or group of species may create an imbalance which often results in the rampant growth of other deleterious microorganisms.

SUMMARY OF THE INVENTION

According to the present invention, it has been found that the newly discovered compound 5-(5'-barbiturilidene)-4-oxothiazolidine-2-imino HCl salt is a very effective antimicrobial agent. Our procedure for preparing this compound proceeds according to the following.

EXAMPLE 1

One-tenth mole (16.0 g.) of alloxan monohydrate and 0.125 mole of (15.5 g.) of pseudothiohydantoin hydrochloride prepared according to the methods taught in Org. Synth., Coll. vol. III, p. 751) are refluxed in 200 ml. of absol. (methanol) on a water bath for three hours. After this reaction time, the solution which is a deep yellow is concentrated through evaporation in vacuo to about ¼ of the original volume and the concentrate is allowed to stand under refrigeration for about 12 hours.

Yellow crystals are formed on the bottom and walls of the breaker as microscopic needles and are separated on a sintered glass funnel, washed with small portions of water and acetone, and dried in an evacuated dessicator. About 18.4 g. (67.4% of theoretical) of the compound (melt pt. 360° C.) are formed.

EXAMPLE 2

The reaction of example 1 is repeated using the reaction conditions and the same molar ratios of alloxan monohydrate and pseudothiohydantoin and replacing the methanol solvent with solvents selected from the group consisting of ethanol, propanol, butanol, isobutyl hexanol, octanol, decanol dodecanol, ethylene glycol monomethyl ether, ethylene glycol monoethyl ether, diethylene glycol monomethyl ether, triethylene glycol monomethyl ether and triethylene glycol monoethyl ether. Substantially the same molar production of 5-(5'-barbiturilidene)-4-oxothiazolidine - 2 - imino HCl salt is achieved.

DESCRIPTION OF THE PREFERRED EMBODIMENTS

The following examples illustrate the antimicrobial qualities of 5-(5'-barbiturilidene) - 4 - oxothiazolidine-2-imino HCl salt and described how these antimicrobial qualtities may be utilized in various phases of agriculture, animal husbandry, and pharmacology.

EXAMPLE 3.—Antibacterial and Antiyeast Activity

The in vitro effectiveness of 5-(5'-barbiturilidene)-4-oxothiazolidine-2-imino HCl salt against bacteria and yeast species is established in the following manner. One loopful of each of the investigated bacteria or yeast is transferred from agar slants to 10 ml. of trypticase soy broth and incubated at 37° for 18 hours. At the end of this period, the bacteria or yeast is seeded into the same medium (1.5–2% agar) in which the original inoculum is prepared. The bacteria are then seeded at 1 ml. of inoculum per 250 ml. of medium, which is equivalent to at least $1 \times 10^6$ cells/ml. determined by dilution platecount or nephelometer readings which has previously been verified by counts. The resultant mixtures are poured into heat-resistant sterile petri dishes at a temperature of 45° C. Analytical filter paper discs 1.2 cm. in diameter are used for the agar diffusion technique. Each disc is saturated with 0.08 ml. of the solubilized 5-(5'barbiturilidene)-4-oxothiazolidine-2-imino HCl salt compound (100 μg./disc) and placed on the surface of the hardened agar. The plates are incubated at 37° C. for 18 hours. The activity of the 5'-(barbiturilidene)-4-oxothiazolidine-2-imino HCl salt compound is established by measuring the zone of inhibition in centimeters. Untreated control plates are used as a basis for comparison and these exhibit a profuse growth of bacteria. The results of these tests are as follows:

| Gram positive and gram negative bacteria | Zone of inhibition in centimeters |
|---|---|
| Streptococcus hemolytic: | |
| Group A | 1.9 |
| Group B | 2.3 |
| Xanthomonas phaseoli, ATCC No. 9563 | 3.1 |
| Staphylococcus aureus, ATCC No. 209P | 1.7 |
| Escherichia coli, ATCC No. 9637 | 0.7 |
| Shigella boydii: | |
| ATCC No. 9212 | tr |
| ATCC No. 9905 | tr |
| Shigella sonnei, MMV 6654 | tr |
| Shigella dysenteriae Type 2, MMV 6673 | tr |
| Salmonella panama, ATCC No. 7378 | 1.3 |
| Salmonella paratyphi, ATCC No. 9281 | 2.0 |
| Salmonella enteritis, ATCC No. 13076 | 2.5 |
| Salmonella pullorum, ATCC No. 10398 | 2.3 |
| Salmonella derby, ATCC No. 6960 | 2.1 |
| Salmonella gallinarium, ATCC No. 9184 | 2.1 |
| Salmonella typhimurium, SR–11 | 2.1 |
| Salmonella typhosa, ATCC No. 19043 | 2.1 |
| Neisseria gonorrhoeae, ATCC No. 19424 | 3.0 |
| Neisseria meningitides: | |
| ATCC No. available on request | 3.1 |
| ATCC No. 13077 | 3.1 |
| Listeria monocytogenes, ATCC No. 15813 | tr |
| Vibrio fetus, ATCC No. 15296 | tr |
| Vibrio cholerae, ATCC No. 14035 | tr |
| Proteus vulgaris, ATCC No. 4984 | tr |
| Erwinia carotovora, ATCC No. 495 | 1.9 |
| Mycobacterium butyricum, ATCC No. 11314 | 1.5 |
| Mycobacterium fortuitum, Debos, ATCC No. 4243 | 1.7 |
| Mycobacterium avium, ATCC No. 19421 | 1.7 |
| Mycobacterium tuberculosis, Va. hominis | 1.0 |
| Mycobacterium phlei, ATCC No. 11782, phage host | 1.9 |
| Klebsiella pneumoniae | tr |
| Micrococcus tetragena, ATCC No. 10875 | 2.7 |

TABLE—Continued

| Gram positive and gram negative bacteria | Zone of inhibition in centimeters |
|---|---|
| Micrococcus melitensis, ATCC No. 19399 | 2.5 |
| Micrococcus lysodeikticus, ATCC No. 4698 | 2.7 |
| Corynebacterium diphtheriae, ATCC No. 19409 | 2.0 |
| Corynebacterium haemolyticum, ATCC No. 9345 | 2.0 |
| Diplococcus intracellularis | 3.1 |
| Diplococcus pneumoniae, ATCC No. 6303 | 3.4 |
| Hemophilus hemolyticus, ATCC No. 10014 | tr |
| Hemophilus influenzae, ATCC No. 19418 | tr |
| Hemophilus parainfluenzae, ATCC No. 7901 | tr |
| Hemophilus suis, ATCC No. 19417 | tr |
| Hemophilus vaginalis, ATCC No. 14018 | tr |
| Brucella abortus, ATCC No. 4315 | tr |
| Brucella melitensis, ATCC No. 19396 | tr |
| Brucella suis, ATCC No. 4312 | tr |

NOTE.—tr=trace.

EXAMPLE 4.—SECONDARY SCREEN ANTIBACTERIAL ACTIVITY

To further define the scope of this invention, secondary screening tests using the techniques described in the primary screening tests were also employed against selected bacteria genera at a concentration of 50/µg./disc. The results of these secondary screens are as follows:

Compound: 5-(5'-barbiturilidene)-4-oxothiazolidine-2-imino HCl salt

| Microorganism | Concentration, 50 µg./disc |
|---|---|
| Salmonella sp., ATCC No. 9120 | 1.1 |
| Salmonella typhimurium miraglia, SR–11 | 1.0 |
| Salmonella No. 45, MMU 1063 | 1.1 |
| Salmonella B/d, MMU 6674 | 1.1 |
| Salmonella, MMU 6668 | 1.0 |
| Pseudomonas aeruginosa: | |
| ATCC No. 10145 | 1.1 |
| ATCC No. 8709 | 1.1 |
| ATCC No. 12055 | 1.0h |
| 28 | 1.1 |
| Pseudomonas maltophilia, G 107 | 1.0 |
| Pseudomonas K997 | tr |
| Pseudomonas K966 | tr |
| Proteus vulgaris: | |
| ATCC No. 9484 | 1.0 |
| ATCC No. 8427 | 1.1 |
| ATCC No. 4699 | 1.0 |
| ATCC No. 6896 | 1.1 |
| ATCC No. 9920 | 1.1 |
| ATCC No. 6897 | 1.3 |
| ATCC No. 12454 | tr |
| Proteus mirabilis, ATCC No. 9961 | tr |
| Proteus morganii, G951 | tr |
| Proteus mirabilis: | |
| K912 | tr |
| K723 | tr |

Comments: h=hazy zone; tr=trace.

This data indicates that 5-(5'-barbiturilidene)-4-oxothiazolidine-2-imino HCl salt compound can be used to inhibit many important types of diseases. For example, it can be used against:

| Bacteria | Disease produced |
|---|---|
| Mycobacterium tuberculosis Var. hominis. | Typical tuberculosis, particularly that which is developed in Southwestern part of the United States due to resistance of mycobacterium to Streptomycin and PAS. |
| Mycobacterium paratuberculosis. | Johne's disease. |
| Staphyloccus aureus | Major cause of bovine mastitis. |
| Streptococcus faecalis | Bacterial endocarditis. |
| Escherichia coli | Cause of scours and secondary cause of bovine mastitis. |
| Proteus vulgaris | Major cause of fish disease (trout, pike). |
| Pseudomonas aeruginosa | Numerous animal and plant infections are caused by various pseudomonads. Urinary infections are notable examples. |
| Erwinia cartovora | Various species of Erwinia attack commercial crops of carrots, tobacco, potatoes squash, et cetera. |
| Xanthomonas phaseoli | Various species of Xanthomonas cause a variety of diseases in plants such as sugar cane, rice, sugar beets, cotton, walnuts, wheat, rye, barley, beans, et cetera. |

The demonstrated antibacterial activity of 5-(5'-barbiturilidene) - 4 - oxothiazolidine-2-imino HCl salt compound against *Staphylococcus aureus* and *Escherichia coli* is of particular interest to the field of pharmacology since the disclosed activity indicates that this compound can be formulated as powders, salves, and ointments for administration in the treatment of burns and bacterially induced inflammations such as abscesses, dermatitis, rashes, and the like, particularly in domestic animals.

Although the precise mode of action whereby 5-(5'-barbiturilidene) - 4 - oxothiazolidine-2-imino HCl salt inhibits bacteria growth is not completely understood, it is believed that the 5-(5'-barbiturilidene) - 4 - oxothiazolidine-2-imino HCl salt compound of this invention may serve as a chemical antagonist; that is, as a chemical which competes with enzymes essential to the development of such bacteria. Since enzymes perform their catalytic function by virtue of their affinity for their natural substrate; any compound resembling a substrate in its chemically critical aspect may also have an affinity for the enzymes. If this affinity is great enough, the analog will displace the normal substrate from the enzyme and will prevent the growth reaction from taking place. It is believed that 5-(5'-barbiturilidene) - 4 - oxothiazolidine-2-imino HCl salt has a chemical affinity for an essential site on one enzyme necessary for bacterial growth and life.

The 5 - (5'barbiturilidene) - 4 - oxothiazolidine-2-imino HCl salt formulations of this invention can also contain other therapeutically valued supplements such as local anesthetics, irradiated oils, and other medicinal substances. When used for these or similar purposes, 5 - (5'barbiturilidene) - 4 - oxothiazolidine - 2 - imino HCl salt may be incorporated in any therapeutically acceptable carrier such as oils, salves and ointments, together with adjuvants comprising surface active agents, detergents, dispersing agents, stablizers and other modifiers which may facilitate the handling and application of the antibacterial material. In the case of the *in vitro* applications of the compositions of this invention, it is difficult to predict with precision what in all cases will constitute a therapeutic dose even on a weight basis. Variable factors such as type, duration and severity of infection and mode of administration may be determining factors for the establishment of therapeutic doses.

Those skilled in the art will recognize that the above data indicates that the scope of this invention should not be limited to any particular disease species or to any particular type of animal or plant life. For example, the noted activity of 5 - (5'barbiturilidene) - 4 - oxothiazolidine-2-imino HCl salt against *Mycobacterium butyricum, Mycobacterium Tuberculosis* var. *hominis,* and *Mycobacterium avian* indicates that this compound will also prove to be of value against such other Mycobacterium species as *Mycobaterium bovis* and *Mycobacterium leprae.*

EXAMPLE 5.—ANTIFUNGAL ACTIVITY

The antifungal activity of 5 - (5'barbiturilidene)-4-oxothioazolidine - 2 - imino HCl salt compound is established by treating *Fusarium oxysporum, Fusarium roseum, Rhizopus nigricans, Rhizopus stolonifer, Aspergillus niger* and *Alternaria solani* test fungi in the following manner:

One loopful of each of the tested viable fungi cultures, spores and mycelia is transferred from an agar slant to an 80 ml. portion of the nutrient broth composed of oatmeal agar, Czapeks, Sabouraud and deionized water to volume. The 80 ml. portion of the fungi and broth is then placed in a sterile shake flask (300 ml.) and the flask is placed on a rotary shaker for 96 to 120 hours at room temperature. At the end of this incubation time period, 10 ml. of the liquid are homogenized and placed into another sterile shake flask (300 ml.) containing 80 ml. of the above nutrient broth and 60 p.p.m. of the inhibitor being evaluated. The flasks are placed on a rotary shaker operating at 240 r.p.m. at room temperature for 3 to 9 days.

After this second incubation time, the flasks are taken off and examined for visible fungal growth and mycelial weights are determined. Untreated controls are used as the basis of comparison and these displayed profuse fungal growth containing species of Fusarium, Rhizopus, Aspergillus and Alternaria. The results of these tests indicated that the 5 - (5'barbiturilidene) - 4 - oxothiazolidine-2-imino HCl salt compound of this invention imparts a substantial degree of inhibition of fungal growth at 60 p.p.m.

EXAMPLE 6.—ANTIFUNGAL AND ANTIYEAST ACTIVITY

To further define the antifungal activity of 5-(5'barbiturilidene) - 4 - oxothiazolidine - 2 - imino HCl salt the seeded agar plates are prepared by transferring the cultures from slants washed with saline or phosphate buffer and then transferred to the surface of hardened Sabouraud-Dextrose agar plates. Again, as in the case of Example 3, the 5-(5'barbiturilidene) - 4 - oxothiazolidine-2-imino HCl salt is tested by impregnating filter paper discs (1.27 cm. in diameter) with 0.08 ml. of the solubilized 5 - (5'barbiturilidene) - 4 - oxothiazolidine-2-imino HCl salt compound (100 μg./disc) and placed on the surface of the hardened agar. The plates are incubated at 30° C. for 18 hours. The activity of 5-(5'-barbiturilidene) - 4 - oxothiazolidine - 2 - imino HCl salt is established by measuring the zone of inhibition in centimeters. Untreated control plates are used as a basis for comparison and these inhibit a profuse growth of bacteria. The results of these tests are as follows:

| Microorganism | Zone of inhibition in centimeters |
|---|---|
| Aspergillus niger, ATCC No. 1004 | 1.1 |
| Alternaria solani, ATCC No. 6396 | 3.1 |
| Rhizopus stolonifer ATCC No. 10404 | 1.1 |
| Fusarium oxysporum, UFCC 1122 | 1.0 |
| Candida albicans (yeast), SRI 523 | 1.0 |

EXAMPLE 7.—SECONDARY FUNGAL SCREEN

A secondary screen using the techniques of Example 6 produced the following results at the 5-(5'barbiturilidene)- 4 - oxothiazolidine - 2 - imino HCl salt concentrations indicated:

| Microorganism | Concentration (λg/disc) 90 | 30 | 10 |
|---|---|---|---|
| Rhodotorula sp., Duke | 3.1 | 2.0 | tr |
| Rhizopus stolonifer, ATCC No. 10404 | 1.5 | 1.0 | tr |
| Monascus purpurea, OU | tr | tr |  |
| Fusarium roseum, UFCC 1166 | 1.4 | tr |  |
| Fusarium oxysporum plus cubense, UFCC 1122 | 1.3 | tr |  |
| Scopulariopsis sp., OU | tr | tr |  |
| Aspergillus niger, SRI | 1.4 | 1.0 | tr |
| Aspergillus niger | 1.4 | 1.1 | tr |
| Aspergillus sydowi, ATCC No. 1017 | 1.7 | 1.3 | tr |
| Aspergillus nidulans, ATCC No. 10074 | 1.6 | 1.1 | t |
| Aspergillus flavus, ATCC No. 9643 | 1.9 | 1.3 | tr |
| Aspergillus amstelodami, ATCC No. 1001 | 2.3 | 2.0 | 1.0 |
| Aspergillus fumigatus | 1.0 | 1.1 | tr |
| Cephalosporium acremonium, ATCC No. 10141 | 1.7 | tr |  |
| Cephalosporium sp., OU | 1.4 | tr |  |
| Phoma pigmentovora, ATCC No. 12569 | 1.9 | 1.0 |  |
| Paecilomyces varioti, ATCC No. 1114 | 1.0 | tr |  |
| Nigrospora sphaerica, ATCC No. 11687 | 1.5 | tr |  |
| Absidia spinosa, ATCC No. 6648 | 1.8 | tr |  |
| Mucor racemosus, ATCC No. 1216 | 1.5 | tr |  |
| Thamnidium elegans, NSC 8997 | 1.9 | tr |  |
| Phycomyces nitens, ATTC No. 9984 | 1.7 | 1.0 | tr |
| Penicillium rubrum, ATCC No. 10520 | 1.5 | 1.0 | tr |
| Penicillium notatum, OU | 1.8 | 1.1 | tr |
| Beauvaria bassiana, MV 1341 | 2.7 | 1.6 | 1.0 |
| Beauvaria tenella, MV 1919 | 2.6 | 1.6 | 1.0 |
| Phialophora verrucosa, OU | 2.8 | 1.9 | 1.0 |
| Cladosporium trichoides, OU | 2.6 | 1.5 | 1.0 |
| Torula bergeri, OU | 3.3 | 1.0 | t |
| Monosporum apiospermum, OU | 3.0 | 1.6 | tr |
| Alternaria solani, ATCC No. 639 | 3.9 | 1.7 | 1.0 |
| Verticillium albo-atrum, ATCC No. 10833 | 2.1 | tr |  |
| Trichophyton mentagrophytes, ATCC No. 9129 | 3.1 | 1.7 | 1.0 |
| Trichophyton mentagrophytes, ATCC No. 8215 | 3.3 | 1.7 | 1.1 |
| Trichophyton tonsurans, ATCC No. 10217 | 3.4 | 1.9 | 1.3 |
| Pythium arrhenomanes, ATTC No. 12531 | 3.6 | 2.0 | 1.1 |
| Helminthosporium oryzae, ATCC No. 11000 | 2.8 | 1.9 | tr |

Comments: tr=trace.

It will also be recognized by those skilled in the art that other protectant, systemic and eradicant procedures may provide detection of other biological activities. Pathogens representative of Phycomycetes, Ascomycetes, Basidiomycetes and the Fungi Imperfecti may provide indices of other fungicidal activity. Additional pathogens and appropriate host plants may well afford other opportunities to further define the degree and spectrum of the activity disclosed in this invention. Since no firm rules of procedure can be laid down for the sequence of such evaluations or for the choice of pathogens, 5-(5'barbiturilidene)-4-oxothiazolidine-2-imino HCl salt must be considered on the basis of its demonstrated performance in such primary evaluations and then progressively judged in subsequent studies. A wide range of pathogens, representative of economically important diseases, can be used to help define 5-(5'barbiturilidene)-4-oxothiazolidine-2-imino HCl salt biological activity and to assure high degrees of success under field conditions. The following disease organisms, crops and reference standards may be used in such evaluations:

| Disease | Disease organism | Reference compound |
|---|---|---|
| Powdery mildew of cucumbers. | Erysiphe cichoracearum | Maneb, karathane. |
| Leaf rust of wheat | Puccinia rubigo-vera | Do. |
| Do | do | Plantvax. |
| Rice blast disease | Piricularia oryzae | Blastidicin. |
| Downy mildew of sugar beet. | Peronospora schactii | Karathane, |
| Downy mildew of lima bean. | Phytophthora phaseoli | Do. |
| Bean rust | Uromyces phaseoli var. typica. | Maneb. |
| Powdery mildew of wheat | Erysiphe graminis | Karathane. |
| Powdery mildew of apple | Podosphaera leucotricha | Do. |
| Powdery mildew of roses | Sphaerotheca pannosa var. rosae. | Do. |
| Powdery mildew of cantalope. | Erysiphe cichoracearum | Do. |
| Leaf spot of wheat | Helminthosporium sativum | Maneb. |
| Early blight of tomato | Alternaria solani | Do. |
| Rice blast disease | Piricularia oryzae | Blasticidin. |
| Cercospora leaf spot of sugar beets. | Cercospora beticola | Maneb. |
| Septoria leaf spot of celery | Septoria apii-graveolentis | Do. |
| Apple scab | Venturia inaequalis | Cyprex. |
| Common bacterial blight of bean. | Xanthomonas phaseoli | Streptomycin sulfate. |

Wherever possible, the Applicants recommend the use of "in vivo" procedures to test the 5-(5'-barbiturilidene)-4-oxothiazolidine-2-imino HCl salt compositions of this invention to demonstrate their efficacy under more realistic conditions. However, not all pathogens lend themselves to such techniques. In order to provide additional spectrum definitions, the following fruit-rotting, storage decay and bacterial pathogens may be tested by "in vitro" methods:

| | | |
|---|---|---|
| Brown rot of stone fruits | Sclerotina fructicola | Captan. |
| Grey mold of fruit and vegetables. | Botryis cinerea | Maneb. |
| Rhizopus fruit and vegetable rot. | Rhizopus nigricans | Do. |
| Citrus green mold | Penicillium digitatum | Do. |
| Citrus blue mold | Penicillium italicum | Karathane. |
| Bacterial disease of many fruit crops. | Pseudomonas syringae | Captan. |
| Bacterial soft rot | Erwinia carotovora | Do. |

In their plant protection aspects, the 5-(5'-barbiturilidene)-4-oxothiazolidine-2-imino HCl salt of this invention may be used in the manner known to the crop protection art; that is, they can be made up in solid or liquid formulations. Examples of solid formulations are dust, wettable powders, granules and pellets. As a dust, 5-(5'barbiturilidene)-4-oxothiazolidine-2-imino HCl salt compound may be dispersed in powdered solid carriers such as talc, soaps, soapstone, attapulgus clay as well as other finely divided solids known in the dusting art. When formulated as wettable powders, the active component may be employed in conjunction with inert fillers which may be of the clay type carrier or non-clay type, in conjunction with various combinations of wetting agents and emulsifiers which permit the adaptation of the concentration as a free-flowing powder for dispersion in the field.

Each of these carriers may in turn contain other carriers or extenders which are ordinarily non-reacting or inert substances such as sand, clays, talc, sawdust, alkaline earth carbonates, oxides, phosphates and the like as well as diatomaceous earth, micas or other suitable materials. When liquid formulations are desired, liquid extenders, dilutants or carriers of a non-reactive nature may be utilized. Examples of such materials are alcohols, ketones, glycols, aromatic hydrocarbons, petroleum fractions such as octane and various other distillates. From these considerations, it will also be recognized that the above formulations with slight modifications may be used in the field of animal husbandry as dusting powders and salves.

Where it is desired to use the aforementioned wettable powders or liquid formulations, either emulsified, dispersed or suspended in water or other fluids, one or more of the class of materials herein referred to as adjuvants can also be incorporated into the powder, dust or liquid formulation. These adjuvants comprise surface active agents, detergents, wettable agents, stabilizers, dispersing agents, suspending agents, emulsifying agents, spreaders, stickers and conditioning agents generally. To their modifying characteristics these adjuvants may facilitate handling and application and infrequently enhance or potentiate the 5 - (5'barbiturilidene)-4-oxothiazolidine-2-imino HCl salt compositions of this invention in their biological activities by mechanisms which are frequently not well understood. A satisfactory but not not exhaustive list of these adjuvants appears in "Soap Chemical Specialties," vol. 31, No. 7, p. 61; No. 8, pp. 28–61; No. 9, pp. 52–67; and No. 10, pp. 38–67 (1955). See also, Bulletin No. 607 of the Bureau of Entomology and Plant Quarantine of the United States Department of Agriculture.

An additional advantage of 5-(5'barbiturilidene)-4-oxothiazolidine-2-imino HCl salt is its compatibility with a variety of other biocidal and fungicidal materials. For example, it may be convenient to combine 5-(5'barbiturilidene)-4-oxothiazolidine-2-imino HCl salt with one or more other adjuvants, carriers, pesticides, biocides or fungicides of various structures. For example, 5-(5'barbiturilidene)-4-oxothiazolidine-2-imino HCl fungicidal inhibitors may be combined with insecticidal materials such as chlordane, benzene hexachlorides, DDT, DDD, the insecticidal carbamates, polychlorinated terpenes, parathions, methozychlor, insecticidal phosphates phosphorothioates, phosphorodithioates and with fungicides such as sulphur, quinones, dodecylguanidine and metal dimethyldithiocarbamates.

There are many other considerations such as concentration and method of application which may make some methods of application more favored than others. These considerations may include the type of organisms on which the compound is to be administered, the degree of activity, the degree of activity toward the particular organism, and side effects. Also to be considered is the cost of production and the characteristic solubility of 5-(5'barbiturilidene)-4-oxothiazolidine-2-imino HCl salt in the carrier material.

What is claimed is:

1. A method of killing or inhibiting the growth of microorganisms selected from the group consisting of fungi, Gram positive bacteria and Gram negative bacteria which comprises contacting said microorganisms with 5-(5'-barbiturilidene)-4-oxothiazolidine-2-imino HCl salt in an amount effective to kill or inhibit the growth of said microorganisms.

2. The method according to claim 1 wherein the Gram positive bacteria are selected from the group consisting of Staphylococci, Corynebacter, Listeria, Micrococci, Mycobacterium, Diplococci and Steptococci.

3. The method according to claim 2 wherein the Staphylococci is *Staphylococcus aureus*.

4. The method according to claim 2 wherein the Corynebacter are selected from the group consisting of *Corynebacterium diphtheriae* and *Corynebacterium haemolyticum*.

5. The method according to claim 2 wherein the Listeria is *Listeria monocytogenes*.

6. The method according to claim 2 wherein the Micrococci are selected from the group consisting of *Micrococcus tetragena, Micrococcus melitensis* and *Micrococcus lysodeikticus*.

7. The method according to claim 2 wherein the Mycobacterium are selected from the group consisting of *Mycobacterium avium, Tuberculosis* var. *hominis, Mycobacterium phlei, Mycobacterium fortuitum,* and *Mycobacterium butyricum*.

8. The method according to claim 2 wherein the Diplococci are selected from the group consisting of *Diplococcus intracellularis* and *Diplococcus pneumoniae*.

9. The method of claim 2 wherein the Streptococci are selected from the group consisting of *Streptococcus hemolytic* group A, and *Streptococcus hemolytic* group B.

10. The method according to claim 1 wherein the Gram negative bacteria are selected from the group consisting of Escherichia, Shigella, Salmonella, Vibrio, Neisseria, Haemophilus, Brucella, Proteus, Pseudomonas, Erwinia and Xanthomonas.

11. The method of claim 10 wherein the Xanthomonas is *Xanthomonas phaseoli*.

12. The method according to claim 10 wherein the Escherichia is *Escherichia coli*.

13. The method according to claim 10 wherein the Shigella are selected from the group consisting of *Shigella boydii, Shigella sonnei* and *Shigella dysenteriae*.

14. The method according to claim 10 wherein the Salmonella are selected from the group consisting of *Salmonella derby, Salmonella enteritis, Salmonella gallinarium, Salmonella panama, Salmonella paratyphi, Salmonella pullorum* and *Salmonella typhosa*.

15. The method according to claim 10 wherein the Vibrio are selected from the group consisting of *Vibrio cholerae* and *Vibrio fetus*.

16. The method according to claim 10 wherein the Neisseria are selected from the group consisting of *Neisseria gonorrhoeae, Neisseria intracellularis* and *Neisseria meningitides*.

17. The method according to claim 10 wherein the Hemophilus are selected from the group consisting of *Hemophilus hemolyticus, Hemophilus influenzae, Hemophilus parainfluenzae, Hemophilus suis* and *Hemophilus vaginalis*.

18. The method according to claim 10 wherein the Brucella are selected from the group consisting of *Brucella abortus, Brucella melitensis* and *Brucella suis*.

19. The method according to claim 10 wherein the Proteus are selected from the group consisting of *Proteus vulgaris, Proteus morganii* and *Proteus mirabilis*.

20. The method according to claim 10 wherein the pseudomonas are selected from the group consisting of *Pseudomonas aeruginosa* and *Pseudomonas maltophilia*.

21. The method according to claim 10 wherein the Erwinia is *Erwinia carotovora*.

22. The method according to claim 1 wherein the fungi are selected from the group consisting of Fusarium, Penicllium, Aspergillus, Alternaria, Rhizopus, Candida, Rhodotorula, Monascus, Scopulariopsis Cephalosporium, Phoma, Paecilomyces, Nigrospora, Absidia, Thamnidium, Phycomyces, Beauvaria, Phialophora, Cladosporium, Torula, Monosporum, Verticillium, Trichophyton, Cercospora, Pythium, Helminthosporium and Microsporum.

23. The method according to claim 22 wherein the Fusarium is selected from the group consisting of *Fusarium roseum, Fusarium oxysporum* and *Fusarium oxysporum cubense*.

24. The method according to claim 22 wherein the Penicillium is selected from the group consisting of *Penicillium rubrum* and *Penicillium notatum*.

25. The method according to claim 22 wherein the Aspergillus is selected from the group consisting of *Aspergillus niger, Aspergillus sydowi, Aspergillus nidulons, Aspergillus flavus, Aspergillus amstelodami and Aspergillus fumigatus.

26. Th method according to claim 22 wherein the Alternaria is *Alternaria solani*.

27. The method according to claim 22 wherein the Rhizopus is *Rhizopus stolonifer*.

28. The method according to claim 22 wherein the Candida is selected from the group consisting of *Candida albicans, Candida krusei, Candida quilliermondii, Candida tropicalis, Candida pseudotropicalis, Candida pulcher-rima, Candida intermedia* and *Candida zeylanoides*.

29. The method according to claim 22 wherein the Rhodotorula is Rhodotorula sp. *Duke*.

30. The method according to claim 22 wherein the Monascus is *Monascus purpurea*.

31. The method according to claim 22 wherein the Scopulariopsis is Scopulariopsis sp. OU.

32. The method according to claim 22 wherein the Cephalosporium is selected from the group consisting of *Cephalosporium acremonium* and Cephalosporium sp. OU.

33. The method according to claim 22 wherein the Phoma is *Phoma pigmentovora*.

34. The method according to claim 22 wherein the Paecilomyces is *Paecilomyces varioti*.

35. The method according to claim 22 wherein the Nigrospora is *Nigrospora sphaerica*.

36. The method according to claim 22 wherein the Absidia is *Absidia spinosa*.

37. The method according to claim 22 wherein the Mucor is *Mucor racemosus*.

38. The method according to claim 22 wherein the Thamnidium is *Thamnidium elegans*.

39. The method according to claim 22 wherein the Phycomyces is *Phycomyces nitens*.

40. The method according to claim 11 wherein the Beauvaria is selected from the group consisting of *Beauvaria bassiana* and *Beauvaria tenella*.

41. The method according to claim 22 wherein the Phialophora is *Phialophora verrucosa*.

42. The method according to claim 22 wherein the Cladosporium is *Cladosporium trichoides*.

43. The method according to claim 22 wherein the Torula is *Torula bergeri*.

44. The method according to claim 22 wherein the Monosporum is *Monosporum apiospermum*.

45. The method according to claim 22 wherein the Verticillium is *Verticillium albo-atrum*.

46. The method according to claim 22 wherein the Trichophyton are selected from the group consisting of *Trichophyton mentagrophytes* and *Trichophyton tonsurans*.

47. The method according to claim 22 wherein the Cercospora is *Cercospora beticola*.

48. The method according to claim 22 wherein the Pythium is *Pythium arrhenomanes*.

49. The method according to claim 22 wherein the Helminthosporium is *Helminthosporium oryzae*.

50. The method according to claim 22 wherein the Microsporum is *Microsporum gypseum*.

References Cited
UNITED STATES PATENTS

| | | | |
|---|---|---|---|
| 3,464,990 | 9/1969 | Brossi et al. | 260—257 |
| 3,547,937 | 12/1970 | Diana | 260—302 |

ALBERT T. MEYERS, Primary Examiner

L. SCHENKMAN, Assistant Examiner

U.S. Cl. X.R.

71—66; 260—258